United States Patent
Imine

(10) Patent No.: US 8,165,995 B2
(45) Date of Patent: Apr. 24, 2012

(54) IMAGE FORMING APPARATUS, CONTROL METHOD THEREFOR, AND STORAGE MEDIUM STORING CONTROL PROGRAM THEREFOR

(75) Inventor: Ryotaro Imine, Machida (JP)

(73) Assignee: Canon Kabushiki Kaisha (JP)

( * ) Notice: Subject to any disclaimer, the term of this patent is extended or adjusted under 35 U.S.C. 154(b) by 331 days.

(21) Appl. No.: 12/437,869

(22) Filed: May 8, 2009

(65) Prior Publication Data
US 2009/0287745 A1    Nov. 19, 2009

(30) Foreign Application Priority Data
May 14, 2008    (JP) .................................. 2008-127389

(51) Int. Cl.
*G06F 7/00* (2006.01)
*G06F 17/00* (2006.01)

(52) U.S. Cl. ........ 707/648; 707/672; 707/662; 707/770; 382/305; 358/1.16; 358/1.1; 358/1.13

(58) Field of Classification Search .................. 707/648, 707/672, 682, 770; 382/305; 358/1.16, 1.1, 358/1.13
See application file for complete search history.

(56) References Cited

U.S. PATENT DOCUMENTS

| | | | | |
|---|---|---|---|---|
| 7,661,032 | B2 * | 2/2010 | Eberbach et al. | 714/38.14 |
| 7,827,447 | B2 * | 11/2010 | Eberbach et al. | 714/45 |
| 7,908,525 | B2 * | 3/2011 | Fujishita | 714/48 |
| 2003/0234947 | A1 * | 12/2003 | Tsuchiya | 358/1.9 |
| 2004/0236764 | A1 * | 11/2004 | Masuda et al. | 707/100 |
| 2005/0193036 | A1 * | 9/2005 | Phillips et al. | 707/202 |
| 2006/0206929 | A1 * | 9/2006 | Taniguchi et al. | 726/6 |
| 2007/0086023 | A1 * | 4/2007 | Kadota | 358/1.1 |
| 2007/0121151 | A1 * | 5/2007 | Uchida | 358/1.15 |
| 2007/0177920 | A1 * | 8/2007 | Katano et al. | 400/76 |
| 2008/0198407 | A1 * | 8/2008 | Fukudome | 358/1.1 |
| 2008/0212136 | A1 * | 9/2008 | Namikata | 358/1.16 |

(Continued)

FOREIGN PATENT DOCUMENTS
JP    2006-236231 A    9/2006

OTHER PUBLICATIONS

Gross, T & Oernig, C.—"PRIMI—An Open Platform for Rapid and Easy Development of Instant Messaging Infrastructures"—Software Engineering and Advanced Applications, 2005, 31$^{st}$ EUROMICRO Conference, Aug. 30-Sep. 3, 2005 (460-467:1-8).*

(Continued)

*Primary Examiner* — John E Breene
*Assistant Examiner* — Anh Ly
(74) *Attorney, Agent, or Firm* — Rossi, Kimms & McDowell LLP

(57) ABSTRACT

An image forming apparatus capable of preventing the degradation of performance when the log data is outputted to an external device. An output unit outputs an operation condition about image forming as log data to an external device. A changing unit changes a detailed degree of the log data outputted by the output unit according to a log level that classifies the detailed degrees of the log data into some levels. A setting unit sets up a limit value corresponding to volume of the log data outputted by the output unit. A control unit controls the log level based on the limit value set up by the setting unit.

5 Claims, 14 Drawing Sheets

U.S. PATENT DOCUMENTS

| | | | | |
|---|---|---|---|---|
| 2008/0247677 | A1* | 10/2008 | Yoshino | 382/305 |
| 2008/0301200 | A1* | 12/2008 | Doty et al. | 707/202 |
| 2008/0301496 | A1* | 12/2008 | Fujishita | 714/20 |
| 2009/0128848 | A1* | 5/2009 | Kamisuwa | 358/1.15 |

OTHER PUBLICATIONS

Pro Apache Struts with Ajax—"Logging and Debugging"—Professional and Applied Computing, Chapter 9, 2007 (pp. 317-357).*

* cited by examiner

FIG. 7A

```
PRINT_A(){
        .
        .
        .
    if(log_level≥5){
    printf(" PRINT_A function was executed.¥n");
    };
        .
        .
        .
};
```

FIG. 7B

```
INT_A_detect(){
            .
            .
            .
        if(int_signal'1'){
            if(log_level≥1){
            printf(Interruption A was detected.¥n");
            }       ;      .
        };              .
};                      .
```

*FIG. 8*

```
===============Log===============
 · MODEL NAME  IRXXXX
 · CONT ver 0.42
 200X/06/01
 LOG LEVEL : 1
===============Log===============

Time        : ID
 0.000.001   OS      initialize
 0.000.333   OS      intrrupt  detect
 0.000.521   DE      SRAM_initialize
 0.003.256   DE      NVRAM_initialize
 0.007.443   FAX     CCC  initialize
 0.009.294   SCAN    DDD  initialize
 0.013.382   PRINT   EEE  initialize
```

FIG. 9

```
===============Log===============
 · MODEL NAME  IRXXXX
 · CONT ver 0.42
  200X/06/01
  LOG LEVEL : 5
===============Log===============

Time         : ID
0.000.001    OS     initialize
0.000.333    OS     intrrupt  detect
0.000.521    DE     SRAM_initialize
0.003.256    DE     NVRAM_initialize
0.007.443    FAX    CCC  initialize
0.009.294    SCAN   DDD  initialize
0.013.382    PRINT  EEE  initialize
0.024.847    COPY   JOB  setting
0.040.958    COPY   JOB  atart
0.394.593    COPY   JOB  end
                    ⋮
```

FIG. 10

```
=============Log=============
 · MODEL NAME  IRXXXX
 · CONT ver 0.42
   200X/06/01
   LOG LEVEL : 7
=============Log=============

Time         : ID 0.000.001  OS    initialize
0.000.333  OS    intrrupt  detect
0.000.521  DE    SRAM_initialize
    00000000  00000000  00000000  00000000
    00000000  00000000  00000000  00000000
    00000000  00000000  00000000  00000000
    00000000  00000000  00000000  00000000
              ⋮
0.003.256  DE    NVRAM_initialize
    000000FF  0000001C  00012340  00000000
    00000000  00000000  00000000  00000000
    00777700  00FF0000  00000000  00000000
    00000000  00000000  00000000  00000000
              ⋮
0.007.443  FAX    CCC  initialize
0.009.294  SCAN   DDD  initialize
0.013.382  PRINT  EEE  initialize
0.024.847  COPY   JOB  setting
0.040.958  COPY   JOB  start
0.394.593  COPY   JOB  end
```

802 — MODEL NAME / CONT ver / date block
803 — LOG LEVEL : 7
804 — 0.000.001 OS initialize
801 — overall log frame

OUTPUT LOG DATA AMOUNT PER UNIT TIME CORRESPONDING TO LOG LEVEL

| LOG LEVEL | LOG VOLUME [MB/s] |
|---|---|
| 1 | $\alpha 1$ |
| 2 | $\alpha 2$ |
| 3 | $\alpha 3$ |
| 4 | $\alpha 4$ |
| 5 | $\alpha 5$ |
| 6 | $\alpha 6$ |
| 7 | $\alpha 7$ |

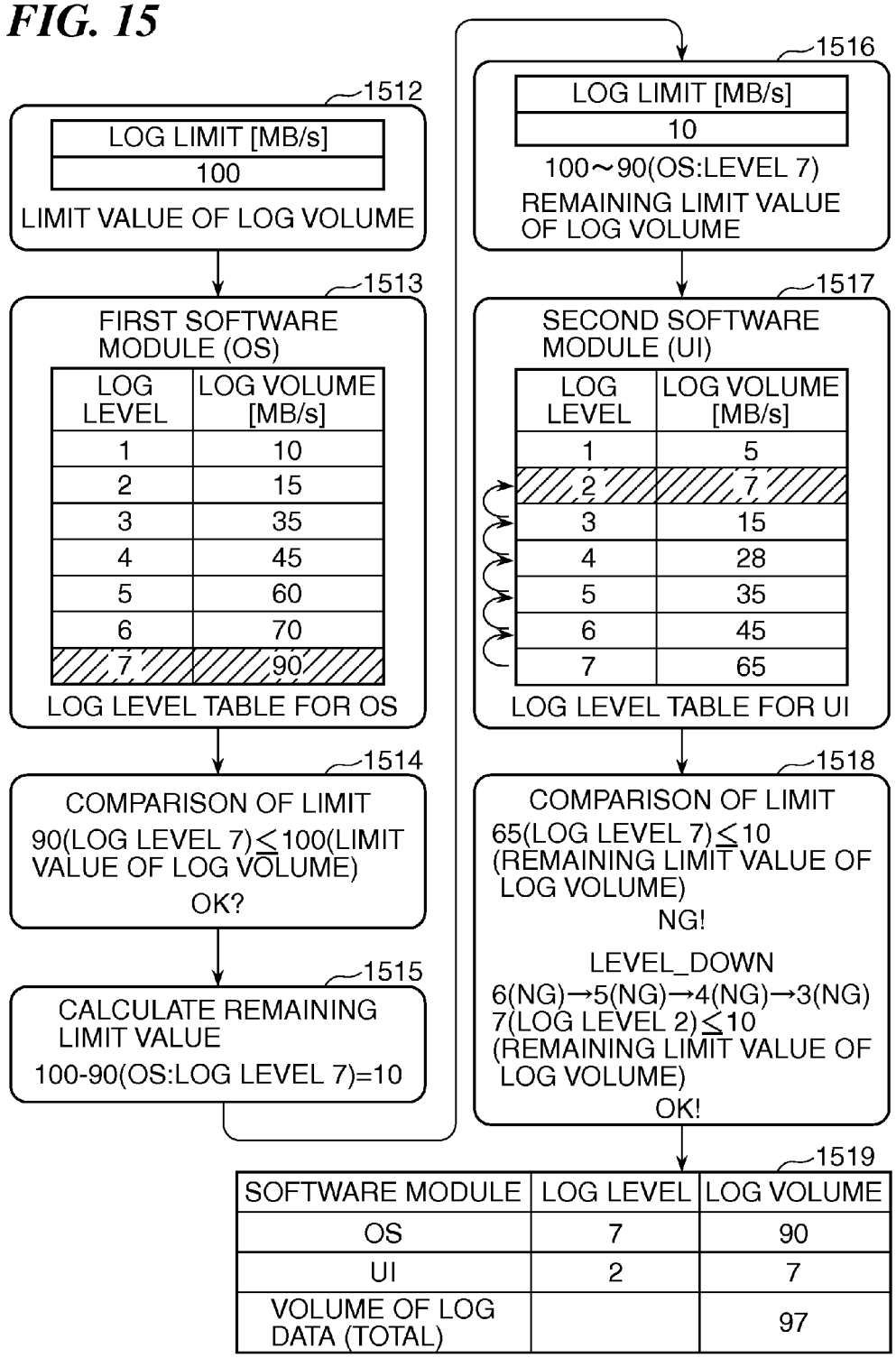

IMAGE FORMING APPARATUS, CONTROL METHOD THEREFOR, AND STORAGE MEDIUM STORING CONTROL PROGRAM THEREFOR

BACKGROUND OF THE INVENTION

1. Field of the Invention

The present invention relates to an image forming apparatus having a function to output log data to an external device, a control method therefor, and a storage medium storing a control program therefor.

2. Description of the Related Art

A multifunctional apparatus that has composite functions, such as a copier, a facsimile machine, and a printer, can output an operation condition as log data.

The log data is necessary when analyzing an error, and it is important. When the log data is collected from the apparatus to analyze an error, a memory device (for example, an SRAM: a static RAM) is connected to a slot designed for specially for log recording, and the log data is recorded on the memory device. This slot is independent from a bus for image data. In such a conventional log data collection method, since a bus conflict does not occur, the log data can be collected without affecting performance.

However, the memory space for recording log data is usually limited. Then, in the conventional log data collection method, a log level that classifies detailed degrees of the log data into some stepwise levels is defined to adjust the detailed degree of the log data. This enables to use a limited resource efficiently.

Conventionally, an operator visited a remote location where an apparatus is installed to take out log data manually. On the other hand, a recent apparatus can transmit log data recorded inside to an external device via a network to analyze an error efficiently and quickly.

Japanese laid-open publication (Kokai) No. 2006-236231 (JP2006-236231A) discloses an automatic log level changing method in which an apparatus automatically detects an operating environment thereof and adjusts the detailed degree of log data.

However, when the log data is transmitted to an external device via a network, the routine transfer process of the data such as printing data to be processed in a multifunctional apparatus, mail data to be transmitted to an external device and scanning data possibly conflict with the transfer process of log data. Such conflict degrades the performances of a network and a multifunctional apparatus.

In the above-mentioned publication, although the detailed degree of log data can be adjusted, the degradation of performance cannot be prevented because the detailed degree of log data is not controlled based on the limit value for the volume of log data.

SUMMARY OF THE INVENTION

The present invention provides an image forming apparatus, a control method therefor, and a storage medium storing a control program therefor capable of preventing the degradation of performance when the log data is outputted to an external device.

Accordingly, a first aspect of the present invention provides an image forming apparatus having an output unit for outputting an operation condition about image forming as log data to an external device, the image forming apparatus comprising a changing unit that changes a detailed degree of the log data outputted by the output unit according to a log level that classifies the detailed degrees of the log data into some levels, a setting unit that sets up a limit value corresponding to volume of the log data outputted by the output unit, and a control unit that controls the log level based on the limit value set up by the setting unit.

Accordingly, a second aspect of the present invention provides a control method for an image forming apparatus having an output unit for outputting an operation condition about image forming as log data to an external device, the control method comprising a changing step of changing a detailed degree of the log data outputted by the output unit according to a log level that classifies the detailed degrees of the log data into some levels, a setting step of setting up a limit value corresponding to volume of the log data outputted by the output unit, and a control step of controlling the log level based on the limit value set up in the setting step.

Accordingly, a third aspect of the present invention provides a computer-readable storage medium storing a control program executing a control method for a control method for an image forming apparatus having an output unit for outputting an operation condition about image forming as log data to an external device, the control method comprising a changing step of changing a detailed degree of the log data outputted by the output unit according to a log level that classifies the detailed degrees of the log data into some levels, a setting step of setting up a limit value corresponding to volume of the log data outputted by the output unit, and a control step of controlling the log level based on the limit value set up in the setting step.

The present invention enables to avoid the degradation of performance when the log data is outputted to an external device.

The features and advantages of the invention will become more apparent from the following detailed description taken in conjunction with the accompanying drawings.

BRIEF DESCRIPTION OF THE DRAWINGS

FIG. 7A and FIG. 7B are code lists showing examples of contents of the log data that records the operation conditions of the image forming apparatus according to the embodiment.

FIG. 8 is a view showing an example of contents of the log data when a log level is "1".

FIG. 9 is a view showing an example of contents of the log data when a log level is "5".

FIG. 10 is a view showing an example of contents of the log data when a log level is set to "7".

FIG. 15 is a reference view showing a calculation process that results in a concrete log level decision based on the process of FIG. 14.

DESCRIPTION OF THE PREFERRED EMBODIMENTS

Hereafter, embodiments according to the present invention will be described in detail with reference to the drawings.

First Embodiment

System Configuration

Figure 1:
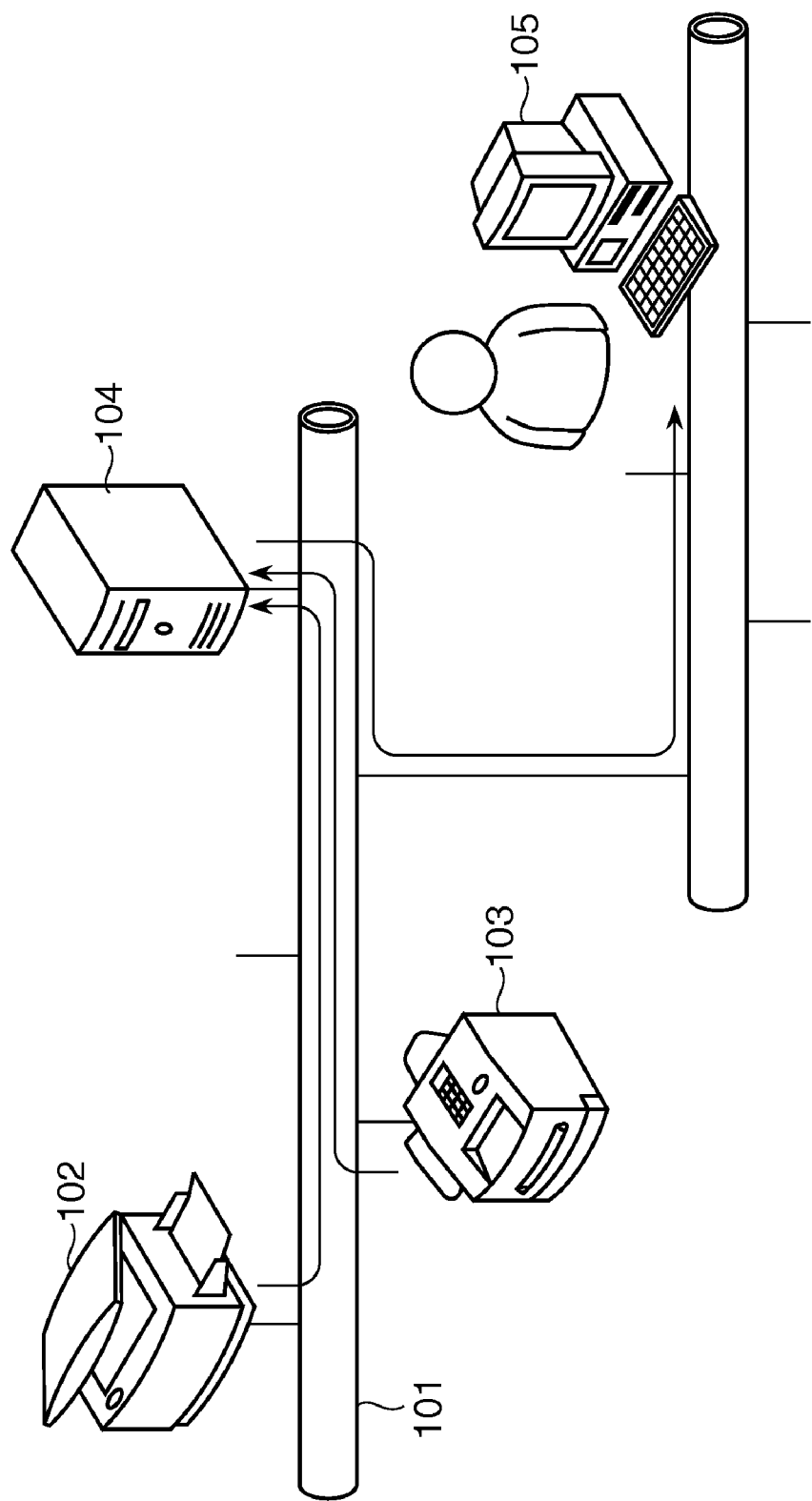
FIG. 1 is a schematic view showing a configuration of a network system including an image forming apparatus according to an embodiment.

FIG. 1 is a schematic view showing a configuration of a network system including an image forming apparatus according to an embodiment of the present invention.

The network system is provided with image forming apparatuses 102 and 103, a server apparatus 104, and a personal computer (it is hereafter referred to as PC) 105 that are connected via a network 101 to each other. The server apparatus 104 acquires log data to which operating conditions of the image forming apparatuses 102 and 103 are recorded via the network 101.

The image forming apparatuses 102 and 103 are multifunctional apparatuses that are provided with a scanner function, a printer function, a copy function, and a facsimile function. These image forming apparatuses 102 and 103 can transmit the log data to which operating conditions are recorded to the server apparatus 104 via the network 101. The image forming apparatuses 102 and 103 transmit the log data to the server apparatus 104 based on their own judgments or external instructions.

The server apparatus 104 is provided with a function for recording and managing the log data received from the image forming apparatuses 102 and 103 for each apparatus, and a function for distributing the log data in response to a request from the PC 105. Further, the server apparatus 104 is provided with a function for relaying setting data when a user operates the PC 105 for remotely setting the image forming apparatus 102 or 103. The server apparatus 104 sets up directly an apparatus which the server apparatus 104 manages as a source form which log data is acquired. For example, an instruction from the PC 105 to change a setting about the log data acquisition and an instruction to send the log data to the server apparatus 104 are transmitted to the image forming apparatuses 102 and 103 through the server apparatus 104.

The PC 105 is a terminal that sets up the image forming apparatus 102 or 103. The PC 105 acquires the log data needed from the server apparatus 104, which totally manages the log data acquired from the image forming apparatuses 102 and 103, and displays the log data on a monitor. A user can analyze an error based on the displayed log data by browsing it.

As mentioned above, the system configuration described in FIG. 1 is an example for explaining the characteristic function that the image forming apparatus of the present invention performs on a system. That is, the scope of the present invention is not limited to the system configuration described in FIG. 1 as long as a system includes an apparatus that can receive, manage, and analyze log data transmitted from the image forming apparatus according to the present invention.

<Configuration of Image Forming Apparatus>

Next, the configuration of the image forming apparatus 102 or 103 in FIG. 1 and an outline of an image forming operation will be explained.

Figure 2:
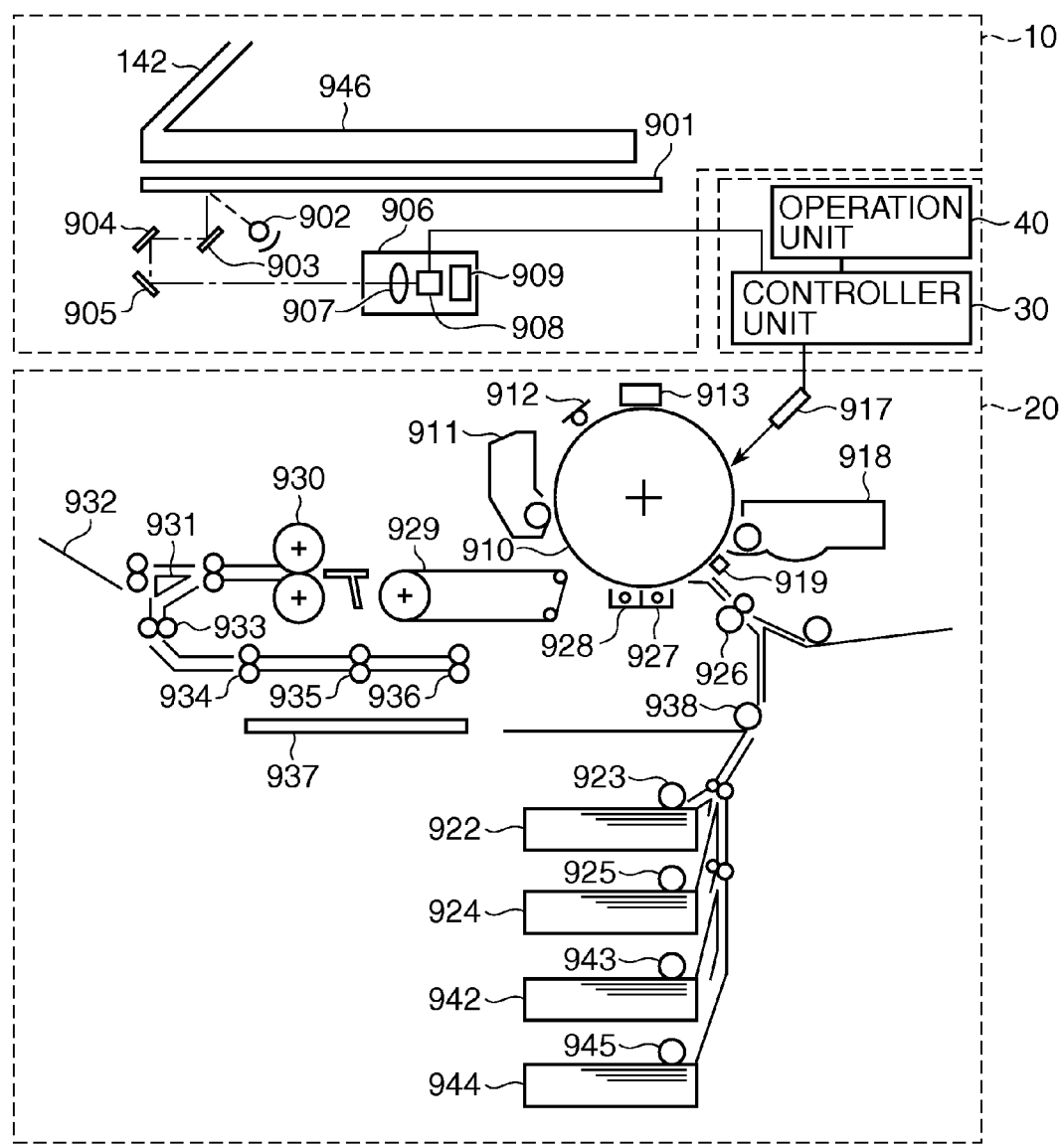
FIG. 2 is a sectional view showing a generic configuration of the image forming apparatus shown in FIG. 1.

FIG. 2 is a sectional view showing a generic configuration of the image forming apparatus 102 or 103 shown in FIG. 1.

The image forming apparatus is provided with a scanner unit 10 as an image input device, a printer unit 20 as an image output device, a controller unit 30 that controls apparatus-wide operations, and an operation unit 40 as a man machine interface device.

The scanner unit 10 is provided with an automatic document feeder 142, a contact glass 901, a document illumination lamp 902, scanning mirrors 903, 904, and 905, a CCD unit 906 and the like. The automatic document feeder 142 feeds a document one by one so that the document is positioned at a predetermined position on the contact glass 901. The document illumination lamp 902, such as a halogen lamp, exposes the document positioned on the contact glass 901. The scanning mirrors 903, 904, and 905 are mounted in an optical scanning unit (not shown) and reciprocate to guide a reflected light from the document to the CCD unit 906. The CCD unit 906 is provided with an image sensor 908 such as a CCD, an image formation lens 907 that refracts the reflected light from a document to form an image on the image sensor 908, and a CCD driver 909 that drives the image sensor 908. The picture signal outputted from the image sensor 908 is converted into 8-bit digital data, for example, and then, is inputted into controller unit 30.

The printer unit 20 is provided with a photoconductive drum 910, an exposure unit 917, a development unit 918, paper units 920, 922, 924, 942, and 944, a transferring charging unit 927, and a fixing unit 930.

The photoconductive drum 910 is discharged by a pre-exposure lamp 912 in preparation for image formation, and is uniformly charged by a primary charging unit 913. The exposure unit 917 comprises a semiconductor laser, a polygonal mirror, and an fθ lens etc., for example, exposes the surface of the photoconductive drum 910 according to the image data processed by the controller unit 30 to form an electrostatic latent image. The development unit 918 accommodates black developer (toner), and develops the electrostatic latent image on the photoconductive drum 910 to form a toner image. A pre-transferring charging unit 919 applies a high voltage to the toner image developed on the photoconductive drum 910 before transferring the image to a paper.

On the other hand, one of feeding rollers 921, 923, 925, 943, and 945 feeds a transfer paper from the corresponding one of paper units 920, 922, 924, 942, and 944 into the apparatus. The transfer paper that is fed stops at the position of a resist roller 926 once, and is fed again in synchronization with the transfer beginning timing of the electrostatic latent image formed on the photoconductive drum 910.

The transferring charging unit 927 transfers the toner image developed on the photoconductive drum 910 to the transfer paper that has been fed. A separation charging unit 928 separates the transfer paper on which the toner image has been transferred from the photoconductive drum 910. The remaining toner on the photoconductive drum 910 without being transferred is recovered by a cleaner 911.

A transferring belt 929 conveys the transfer paper to which the above-mentioned transferring process has been applied to the fixing unit 930. The fixing unit 930 fixes the toner image onto the transfer paper by means of heat, for example. The transfer paper to which the fixing process has been applied is conveyed to a sorter 932 or a middle tray 937 via a flapper 931.

The controller unit 30 is provided with a microcomputer mentioned later and an image processing unit, and controls the above-mentioned image formation operation according to instructions from the operation unit 40.

<Configuration of Controller Unit>

Figure 3:
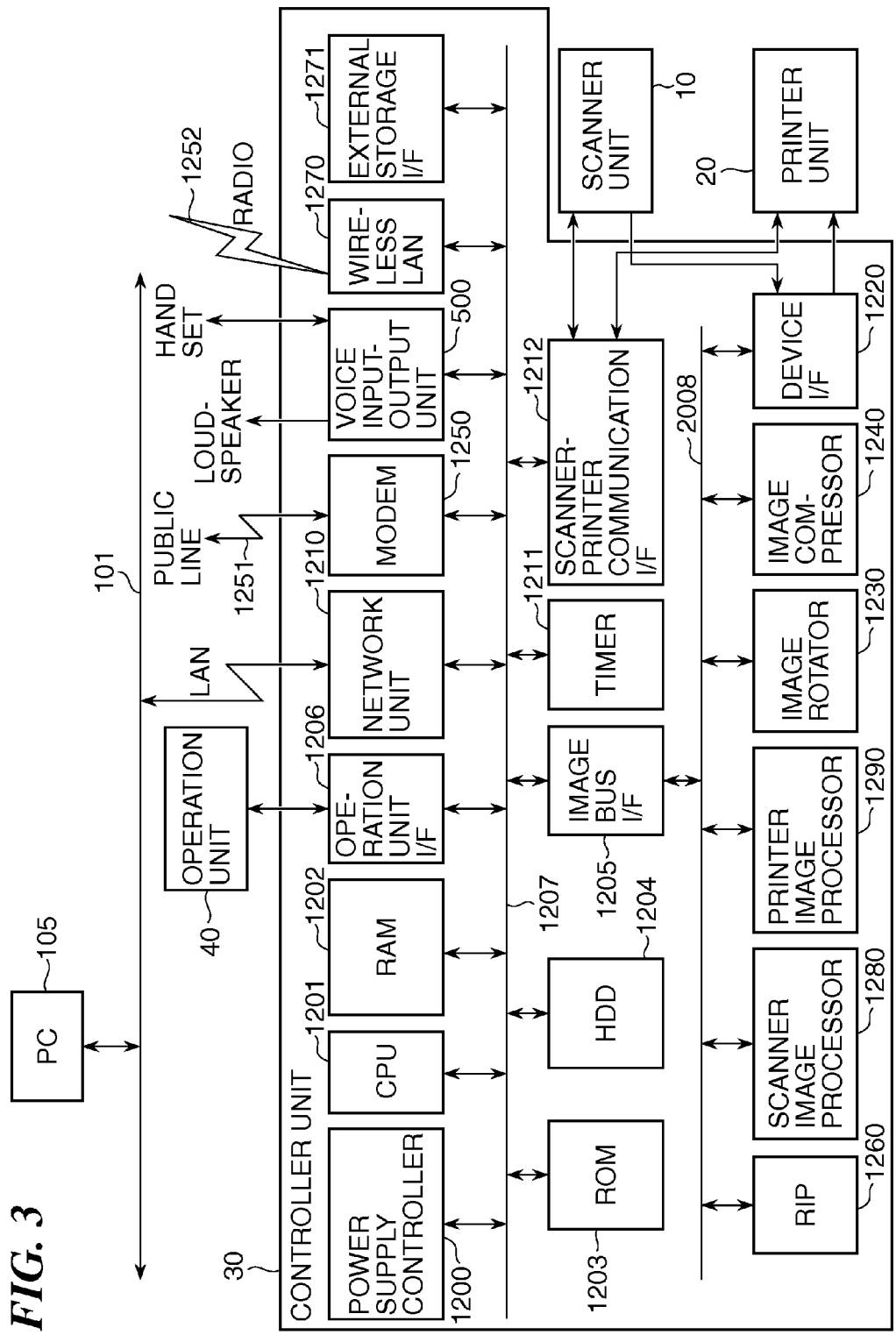
FIG. 3 is a block diagram showing a configuration of a controller unit of the image forming apparatus shown in FIG. 2.

FIG. 3 is a block diagram showing a configuration of the controller unit 30 of the image forming apparatus 102 or 103 shown in FIG. 2.

The controller unit 30 is connected with the scanner unit 10 and the printer unit 20. The controller unit 30 is constituted so as to be also able to connect with the wire network (LAN) 101, a public line (WAN) 1251, and a wireless network (a wireless LAN) 1252. The controller unit 30 controls I/O of various data, such as image data and device information, between image forming apparatus 102 or 103 and a peripheral device such as the PC 105 or a digital camera.

The controller unit 30 is provided with a power supply controller 1200, a CPU 1201, a RAM 22, a ROM 1203, an HDD 1204, an operation unit I/F (interface) 1206, a network unit 1210, a modem 1250, a wireless LAN 1270, an external storage I/F 1271, a timer 1211, an image bus I/F 1205, and a scanner-printer communication I/F 1212, all of which are connected with a system bus 1207.

The CPU 1201 is a controller that controls the whole system. The RAM 1202 is a memory using a volatile device that allows high-speed writing, such as an SDRAM and an SRAM. The SDRAM of the RAM 1202 functions as a system work memory for the operation of the CPU 1201, and as an image memory for storing image data temporarily. The SRAM is normally backed up by a backup battery (not shown), and stores a user setting such as a log level of log data. The log level is used to classify detailed degrees of the log data into some stepwise levels.

The ROM 1203, which is a boot ROM using a device such as a rewritable flash ROM, stores a boot program and setting values of the system. The HDD 1204 is a hard disk drive that stores system software, application software, image data, log data, and the like. The operation unit I/F 1206 is an interface with the operation unit (UI) 40, sends the image data to the operation unit 40 so as to be displayed thereon, and transfers the user input data from the operation unit 40 to the CPU 1201.

The network unit 1210 is connected to the LAN 101, and is used as an input-output unit for various data about the output image and for data about device controls. The network unit 1210 outputs the image by receiving the output image data from the PC 105 and the like on the network 101 in response to the input operation in the operation unit 40.

The modem 1250 is connected to the public line 1251, and inputs and outputs data. A voice input-output unit 500 executes control to output a sound signal to a loudspeaker, outputs a sound signal to a hand set, and inputs a sound signal from the hand set. The wireless LAN 1270 is connected to peripheral devices by the radio 1252, and is used as an input-output unit for various data about the output image and for data about device controls. The scanner printer communication I/F 1212 is an interface for communicating with the CPU of the scanner unit 10 and the CPU of the printer unit 20, respectively. The timer 1211 sets times of the image forming apparatus and the controller unit 30, and periodically generates an interruption timing.

The image bus I/F 1205 is a bus bridge for connecting the system bus 1207 to an image bus 2008 that transfers image data at high speed, and for converting a data structure. The image bus 2008 consists of a PCI bus or IEEE1394. A raster image processor (RIP) 1260, a device I/F 1220, a scanner image processor 1280, a printer image processor 1290, an image rotator 1230, and an image compressor 1240 are connected to the image bus 2008.

The raster image processor (RIP) 1260 develops a PDL code to a bitmap image. The device I/F 1220 connects the scanner unit 10 and the printer unit 20 to the controller unit 30, and converts the image data between a synchronizing system and an asynchronous system. The scanner image processor 1280 corrects, processes, and edits inputted image data. The printer image processor 1290 corrects print-output image data, and changes the resolution thereof. The image rotator 1230 converts image data to rotate the image. The image compressor 1240 compresses and decompresses image data.

The CPU 1201 controls the operations of the above-described devices (units) by executing the system software loaded onto the RAM 1202 from the HDD 1204 that stores the system software. The operation conditions of the devices are recorded into the RAM 1202 or the HDD 1204 as the log data. The recorded log data is transmitted to the PC 105 or the like through the network unit 1210 according to an instruction from the operation unit 40, the PC 105 or the like.

<Configuration of System Software>

Next, software modules that constitute the system software according to the embodiment will be described with reference to FIG. 5.

Figure 5:
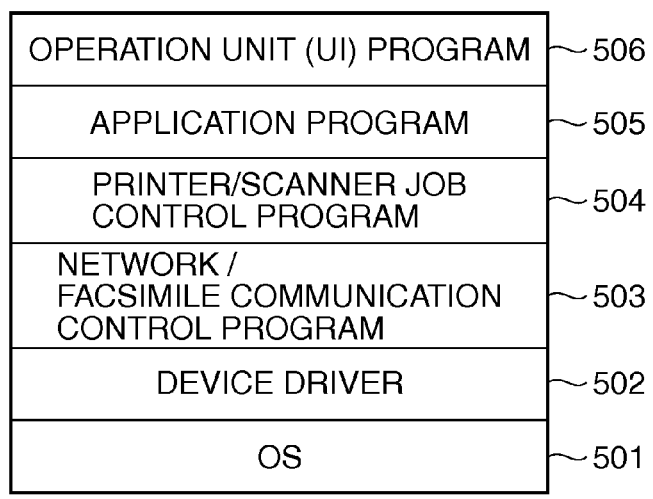
FIG. 5 is a conceptual view showing an example of software modules that constitute a system software of the image forming apparatus according to the embodiment.

FIG. 5 is a conceptual view showing an example of software modules that constitute the system software of the image forming apparatus according to the embodiment.

The system software of the image forming apparatus according to the embodiment is recorded onto the HDD 1204. The CPU 1201 loads the system software from the HDD 1204 to the RAM 1202 and executes it, when the image forming apparatus of the embodiment starts up. The system software has a layer structure and the layer dependent on hardware is the lowest layer.

As shown in FIG. 5, the system software has an OS (operating system) 501, a device driver 502, a network/facsimile communication control program 503, a printer/scanner job control program 504, an application program 505, and an operation unit program 506. Each of the software modules constitutes one layer. Interfaces among the respective layers are prescribed in advance. The respective layers are connected by transferring the prescribed instructions and the parameters.

The prescribing of the interfaces among the layers allows independent software developments for the respective layers. This is effective for developing large-scale and complicated software adapted to the image forming apparatus according to the embodiment.

Next, each software module is described.

The operation unit program 506 receives an input signal generated by an operation of the liquid crystal touch panel or a hardware key that are provided to the operation unit 40 described later, and controls an indication based on the display instruction to the display unit. The application program 505 is user software such as a web browser. The printer/scanner job control program 504 is a control program for realizing a series of copy functions, such as communication with the scanner unit 10 or the print section 20, for example, when the image forming apparatus of the embodiment executes a copy function.

The network/facsimile communication control program 503 controls the communication that uses the network unit 1210 and the modem 1250. The device driver 502 is a group of device control programs that are executed when a control program uses a device such as the HDD 1204, the ROM 1203, the RAM 1202. For example, when the image data captured by executing the scanner function is temporarily recorded into the HDD 1204, the scanner job control program 504 records the image data using an HDD device driver.

The operating system 501 manages an individual operation such as the scanning operation, the printing operation, or the writing operation into the HDD 1204 as one task, when the image forming apparatus of the embodiment executes the copy function, the facsimile function, or the SEND function (the function for sending scanned data to the external PC 105). The operating system 501 executes these tasks in parallel as a multitask operation: manages hardware resources such as the RAM 1202, and executes network communication protocol process when the network unit 1210 inputs and outputs data.

It should be noted that FIG. 5 shows an example of the software module that constitutes the system software, and the scope of the present invention is not limited to the configuration shown in FIG. 5.

<Data Flows When Executing SEND Function and Transmitting Log Data>

Next, data flows when executing a SEND function and when transmitting log data in the image forming apparatus according to the embodiment will be described.

Figure 4:
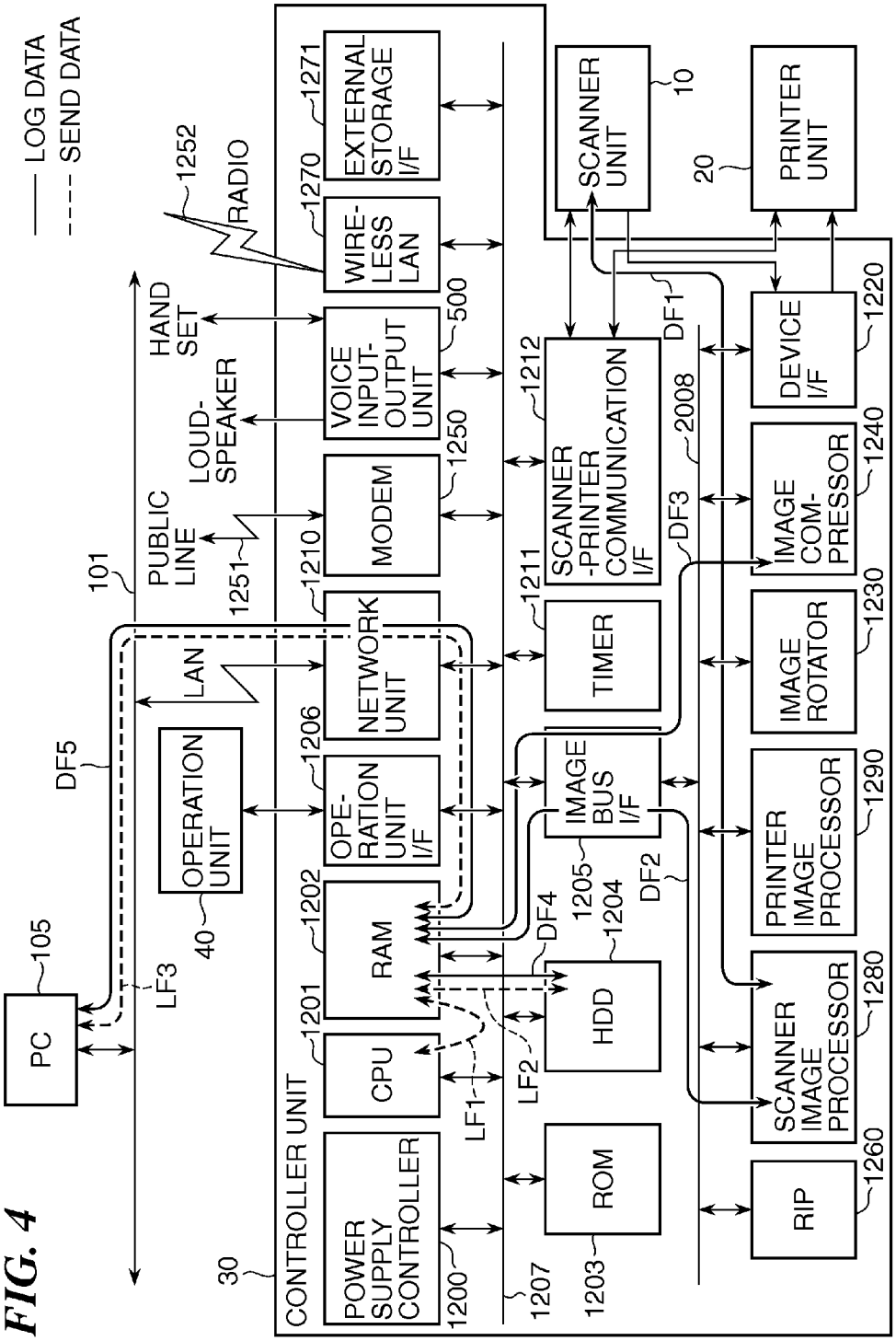
FIG. 4 is a data flow view showing data flows when a SEND function is executed and log data is transmitted on the block diagram of FIG. 3.

FIG. 4 is a data flow view showing data flows when the SEND function is executed and when log data is transmitted on the block diagram of FIG. 3.

(a) Data Flow When Executing SEND Function

First, the data flow when executing the SEND function will be described. The data flows by the SEND function are shown by solid lines in FIG. 4.

The image data read by the scanner unit 10 is inputted into the control unit 30 through the device I/F 1220. The inputted read data is inputted into the scanner image processor 1280 on the image bus 2008 (the flow DF1 in FIG. 4). The scanner image processor 1280 processes and edits the image data by a gradation correction, a masking process, a background removing process, and the like.

The data processed by the scanner image processor 1280 is temporarily stored into the RAM 1202 on the system bus 1207 through the image bus I/F 1205 (the flow DF2 in FIG. 4).

Next, the CPU 1201 reads the image data stored in the RAM 1202, and sends the read image data to the image compressor 1240 on the image bus 2008 through the image bus I/F 1205 (the flow DF3 in FIG. 4). The image compressor 1240 applies the image compression process to image data with a known compression technology. The compressed image data is temporarily stored into the RAM 1202 through the image bus I/F 1205. The compressed image data temporarily stored in the RAM 1202 is once accumulated in the HDD 1204. To read a plural page document, the above-described process until accumulating into the HDD 1204 is repeated for every page (the flow DF4 in FIG. 4).

When all the pages of the document has been read, the flow for transmitting the data accumulated in the HDD 1204 to the PC 105 will be executed. In the transmitting flow, the compressed image data accumulated in the HDD 1204 is temporarily stored in a work memory provided on the RAM 1202 so that the network unit 1210 transmits the data. The network unit 1210 reads the data one by one using the work memory as a transmission buffer and transmits the data to the PC 105 connected by the LAN 101 (the flow DF5 in FIG. 4).

(b) Data Flow When Transmitting Log Data

Next, the data flow when transmitting the log data is described. It should be noted that the data flows at the log data transmission are shown by the dotted lines in FIG. 4.

First, the CPU 1201 sequentially reads and executes the system program developed on the RAM 1202, and temporarily records the log data corresponding to the log level into the RAM 1202 (the flow LF1 in FIG. 4). The log data temporarily recorded in the RAM 1202 is accumulated in the HDD 1204 (the flow LF2 in FIG. 4).

Next, when transmitting the data to the PC 105, the CPU 1201 temporarily stores the log data into the work memory provided on the RAM 1202 so that the network unit 1210 transmits the log data. The network unit 1210 sequentially reads the data one by one using the work memory as a transmission buffer, and transmits the read data to the PC 105 connected by the LAN 101 (the flow LF3 in FIG. 4).

<Relation Between Performance and Limit Value of Log Volume Under Conflict Condition>

Next, the relation between performance and a limit value of the log volume (volume of log data) in the image forming apparatus under a conflict condition where the normal data transmitting process conflicts with the log-data transmitting process will be described with reference to FIG. 6.

Figure 6:
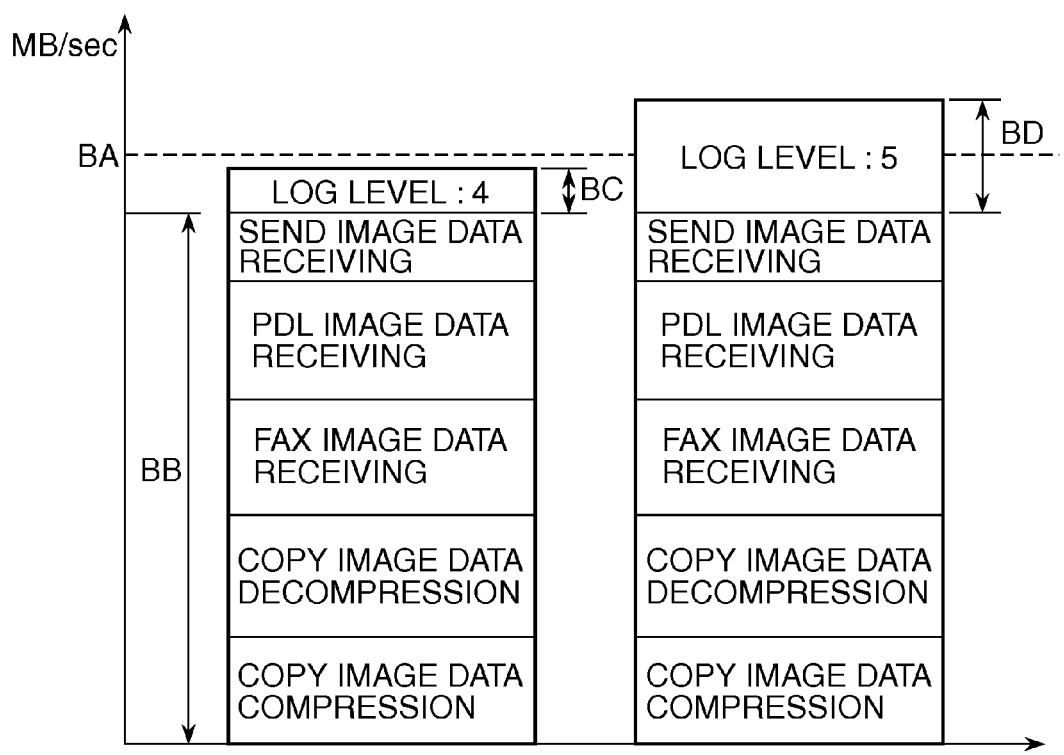
FIG. 6 is a conceptual view showing relation between the performance and a limit value of log volume in the image forming apparatus under a conflict condition according to the embodiment.

FIG. 6 is a conceptual view showing relation between the performance and the limit value of log volume in the image forming apparatus under the conflict condition according to the embodiment.

As described based on FIG. 4, the execution of the SEND function causes many accesses to the RAM 1202. The execution of another function also causes many accesses. The access to the RAM 1202 is a bottleneck point to the performance. The controller unit 30 is designed so as to maintain high performance of the image forming apparatus even when various functions including the SEND function are executed in parallel. The performance of the image forming apparatus is defined as the print speed (count per minute) and the scan speed (count per minute), for example.

In FIG. 6, a vertical axis represents an access speed (MB/second), and a relation between access factors to the RAM 1202 and bands of the RAM 1202 is shown. The cases shown in FIG. 6 assume that the access factors to the RAM 1202 conspire by executing copy, facsimile, print, and SEND functions in parallel in an apparatus such as the image forming apparatus of the embodiment. In FIG. 6, the full band BA of the RAM 1202 is shown by a dot line. A band BB shows an accumulated result of the maximum bands used in the respective functions. A band BC or BD, which is necessary to output the log data of each log level, is stacked on the band BB. In the example of FIG. 6, the log levels "4" needs the band BC, and the log level "5" needs the band BD.

In FIG. 6, "copy image data compression" is a RAM access factor generated after the compression process of the document read data in the copy function. "Copy image data decompression" is a RAM access factor generated after the decompression process of the compressed read data when printing in the copy function. "FAX image data receiving" is a RAM access factor generated when the data received by the modem 1250 via the public line 1251 shown in FIG. 3 are stored in a buffer. "PDL data receiving" is a RAM access factor generated when the PDL data received from the PC 105 via the LAN 101 is stored in a buffer. "SEND data receiving" is a RAM access factor generated when the SEND received data from an external image forming apparatus is stored in a buffer. It should be noted that a RAM access factor is not limited to the above-described factors.

As shown in FIG. 6, the RAM access band at the log level "4" falls within the full band BA of the RAM 1202, which satisfies the performance required by the system under the conflict condition. However, the RAM access band at the log level "5" exceeds the full band BA of the RAM 1202, which cannot satisfy the performance required by the system under the conflict condition.

In FIG. 6, the difference subtracting the accumulated band BB from the full band BA is a margin when the respective functions occupy the maximum bands thereof, and is a limit value of the bus band that can be allocated to output the log data in order to satisfy a performance.

<Program Code Concerning Log Data>

Next, contents of the program code concerning the log data used in the embodiment will be described with reference to FIG. 7A and FIG. 7B.

FIG. 7A and FIG. 7B are code lists showing examples of contents of the log data that records the operation conditions of the image forming apparatus according to the embodiment.

The log data that will be output at the execution of the program is described in the program code corresponding to the log level in advance as shown in FIG. 7A and FIG. 7B. For example, as shown in FIG. 7A and FIG. 7B, when a certain function is executed, the program determines whether or not to output the log data based on the log level that is set at the time.

In the example shown in FIG. 7A, when the log level is "5" or more, the execution of the PRINT_A( ) function causes the program to output the log data of "PRINT_A function was executed" as defined in the "if" statement and the "print-f" statement.

In the example shown in FIG. 7B, when the log level is "1" or more and an interrupt signal satisfies the condition of "int_signal=1" as a result of the execution of an INT_Detect function, the program outputs the log data of "Interruption A was detected".

Thus, the contents of the log data outputted are described in the program code corresponding to the log level.

It should be noted that the partial codes shown in FIG. 7A and FIG. 7B show examples of the output method of the log data corresponding to the log level in the image forming apparatus of the embodiment. Therefore, if the program code includes a description to be able to control the output of the log data corresponding to the log level, it is enough. The description is not limited to the above-described contents.

<Example of Contents of Log Data>

(a) Example of Contents of Log Data 1 (Log Level is "1")

FIG. 8 is a view showing an example of contents of the log data when a log level is "1".

A header part 602 of the log data consists of a column for a model name of an image forming apparatus, a column for a version of system software, a column for a date when the log data is obtained, and a column 603 for a log level when the log data is obtained. The contents "IRXXXX", "CONTver0.42", "200X/06/01", and "LOG_LEVEL:1" are written in the respective columns.

The number written in the log level displaying column 603 represents the detailed degree of the data outputted as the log data. That is the log level. There are seven steps for the level of the detailed degree. The log level is recorded in the RAM 1202 or the ROM 1203.

When the log level is "1", the contents of the outputted log data are limited to the minimum contents, such as system error information and a generation of error interrupt process, which are necessary to grasp the condition of the image forming apparatus when a system-level error occurs therein. When the log level is "1", the volume of the log data outputted per unit time is least.

An operation condition part 604 in the log data 601 consists of a section for "time" and a section that represents "ID" and operation information for each software module, fundamentally.

(b) Example of Contents of Log Data 2 (Log Level is "5")

FIG. 9 is a view showing an example of contents of the log data when a log level is "5".

The configuration of the log data of this example is the same as the configuration of the log data shown in FIG. 8. That is, the log data of this example contains an operation information part 704 in addition to a header part 702 and a log level indication part 703. The operation information part 704 includes a time section, a software layer ID section, and an operation information section.

When the log level is "5", data about setting and status of a job (print data) are added to the outputted log data. For example, setting and status about each function, such as user setting data for the copy function set up with the operation unit 40, are outputted as the log data. The log data at the log level "5" is used when checking whether operation of each function is executed according to the sequence.

It should be noted that FIG. 6 is an example for showing that the recording data amount increases as the log level becomes up to "5". The contents of the operation information that increase in response to the increase of the log level are not limited to the contents shown in the figure.

(c) Example of Contents of Log Data 3 (Log Level is 7)

FIG. 10 is a view showing an example of contents of the log data when the log level is "7".

The configuration of the log data of this example is the same as the configuration of the log data shown in FIG. 8. That is, the log data of this example contains an operation information part 804 in addition to a header part 802 and a log level indication part 803. The operation information part 804 includes a time section, a software layer ID section, and an operation information section.

When the log level is "7", communication data for the network and for the facsimile, and dump output about read/write data for a memory are added to the outputted log data. The log data at the log level "7" are used for analysis when communications data is corrupted, initialization of a memory device is failed, or written data is corrupted.

In the example of FIG. 10, the operation information of "SRAM_initialize" that represents initialization and the dump result of "00000000 00000000 . . . (following is omitted)" after the initialization of the SRAM are recorded. The dump value after initialization of NVRAM at the time of "0.003.256" is also recorded. Recording data amount increase as the detailed degree of the log data about a device driver increases.

When the log level is "7", the output data amount of the log data per unit time is largest among all the log levels to be decided.

As mentioned above, the minimum elements that constitute the log data are the header part, the log level displaying part, and the operation information part that includes the time section, the software layer ID section, and the operation information section. The elements of the log data are not limited to the elements shown in FIG. 8, FIG. 9, and FIG. 10.

<Relation Between Log Level and Output Data Amount of Log Data>

Next, a relation between the log level and output data amount of the log data (hereafter described as output log data amount) will be described with reference to FIG. 11A and FIG. 11B.

Figures 11A, 11B:
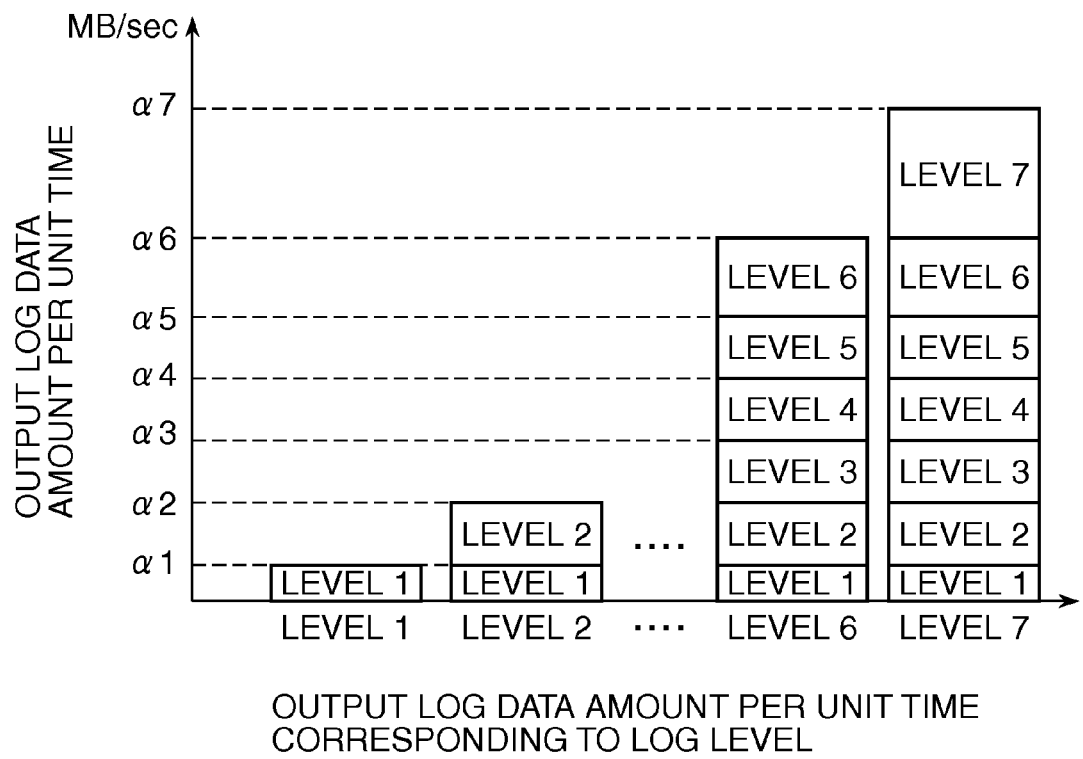
FIG. 11A is a graph showing a relation between the log level and a data amount of output log data per unit time according to the embodiment.
FIG. 11B is a log level table that defines a data amount of output log data set in response to the log level according to the embodiment.

FIG. 11A and FIG. 11B show the relation between the log level and the output log data amount according to the embodiment. FIG. 11A is a graph that shows the relation between the log level and the output log data amount per unit time, and FIG. 11B is a log level table that defines the output log data amount corresponding to the log level.

The example of FIG. 11A shows that the output log data amount per unit time when the log level is "1" is α1 MB/s. As the log level rises from 2 to 7, additional log data to be outputted increases, which increases the output data amount from α2 to α7 MB/s.

The output log data amount per unit time corresponding to each log level can be found by surveying amount of the actually outputted log data. In the image forming apparatus of the embodiment, the output log data amount corresponding to the log level shown in FIG. 11A can be set in the log level table (FIG. 11B) that can be referred to by the program.

<Log Level Decision Process According to First Embodiment>

Next, the log level decision process according to the first embodiment is described with reference to FIG. 12 and FIG. 13.

Figure 12:
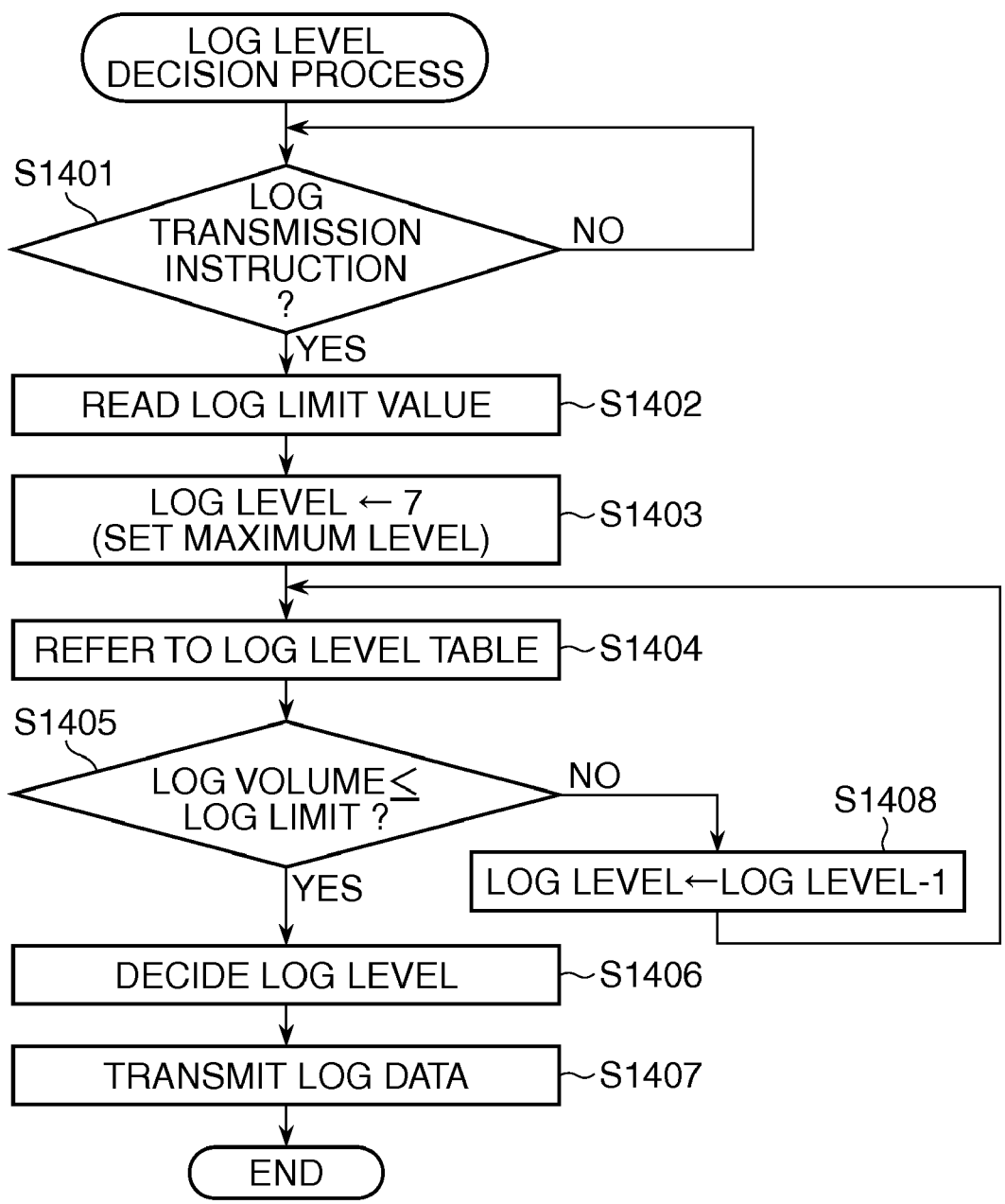
FIG. 12 is a flowchart showing a log level decision process of the image forming apparatus according to a first embodiment.

FIG. 12 is a flowchart showing a log level decision process of the image forming apparatus according to the first embodiment. FIG. 13 shows examples of the limit value of log volume and the log level table that are used in the process in FIG. 12.

The log level decision process is carried out by the CPU 1201 that executes the program developed on the RAM 1202. First, the CPU 1201 determines whether to receive a log transmission instruction in S1401. Receiving the instruction, the CPU 1201 reads the limit value (1410 in FIG. 13) of the log volume, which has set in advance, in the next step S1402. Then, the CPU 1201 sets the log level to "7" that is the maximum level in the step S1403. The CPU 1201 refers to the log volume corresponding to the log level "7" in the log level table (1409 of FIG. 13) in the next step S1404.

Figure 13:
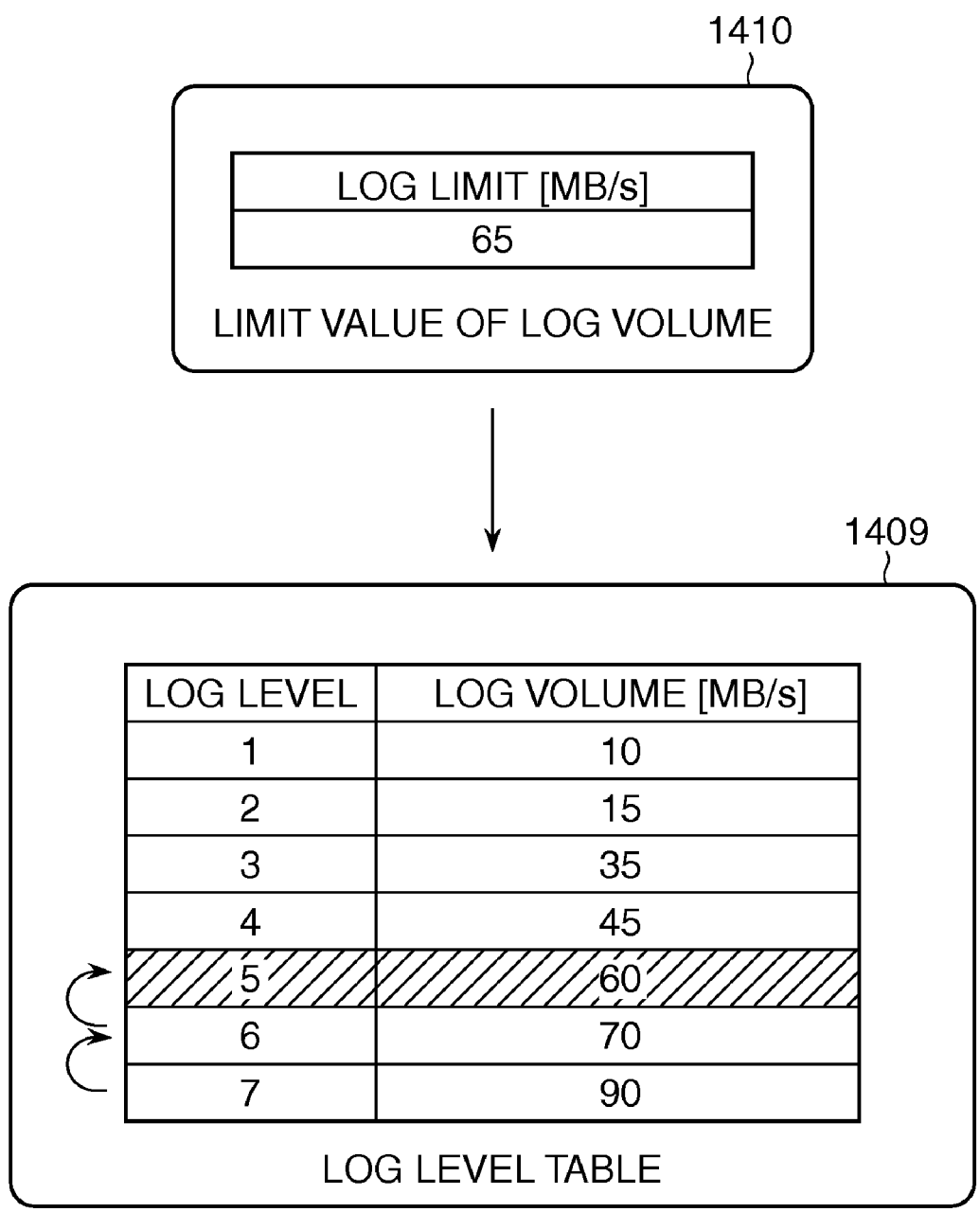
FIG. 13 is a view showing examples of a limit value of log volume and the log level table that are used in the process of FIG. 12.

The log volume limit value 1410 and the log level table 1409 shown in FIG. 13 are beforehand set in the image forming apparatus of the embodiment. The log volume limit value 1410 is set as the limit value of the log volume that has been beforehand calculated corresponding to the performance under the conflict condition shown in FIG. 6. Specifically, the difference (value of BA−BB) subtracting the accumulated band BB, which is an accumulated result of the maximum bands used in the respective functions, from the full band BA of the RAM 1202 in FIG. 6 becomes the limit value of the log volume. The table values (FIG. 11B), which are calculated based on the relations between the log levels and the output log data amounts shown in FIG. 11A, are beforehand set into the log table 1409 in FIG. 13.

Then, in S1405, the CPU 1201 compares the limit value read in S1402 and the log volume referred to in S1404. In the example of FIG. 13, the log volume in the log level "7" is 90 MB/s, while the limit value is 65 MB/s. In this case, since the CPU 1201 determines that the condition where the log volume is lower than the limit value is not satisfied, the process proceeds to S1408 and lowers the log level by "1".

Next, the CPU 1201 refers to the log volume corresponding to the log level "6" in S1404, and compares the read log volume with the limit value in S1405. When the log level is "6", the log volume is 70 MB/s. This does not satisfy the condition. The CPU 1201 lowers the log level by "1" in S1408 again, and the log level becomes "5". When the log level is "5", the log volume is 60 MB/s. This satisfies the condition. The CPU 1201 determines the log level at this time in S1406, and transmits the log data under the condition of the log level "5" in the next step S1407.

<Advantages of First Embodiment>

According to the first embodiment, the surplus section of the system performance is set up as a limit value to the volume of the log data transmitted through the network. The setup of the log level is restricted based on the limit value, and the output data amount of the log data is controlled to become lower than the limit value. Accordingly, the degradation of performances of the network and the image forming apparatus can be avoided when the normal data transmitting process conflicts with the log-data transmitting process.

Second Embodiment

The process of the first embodiment (FIG. 12) shows the operation about a log level setup for a single software module. On the other hand, a second embodiment is described for a case where the system software consists of a plurality of software modules. In this case, the log level is controlled for each of the software modules constituting the system software shown in FIG. 5. Since the log levels of the software modules are individually controlled, the contents of the log data can be controlled for each module, which improves convenience.

<Log Level Decision Process According to Second Embodiment>

Next, the log level decision process according to the second embodiment will be described with reference to FIG. 14 and FIG. 15.

Figure 14:
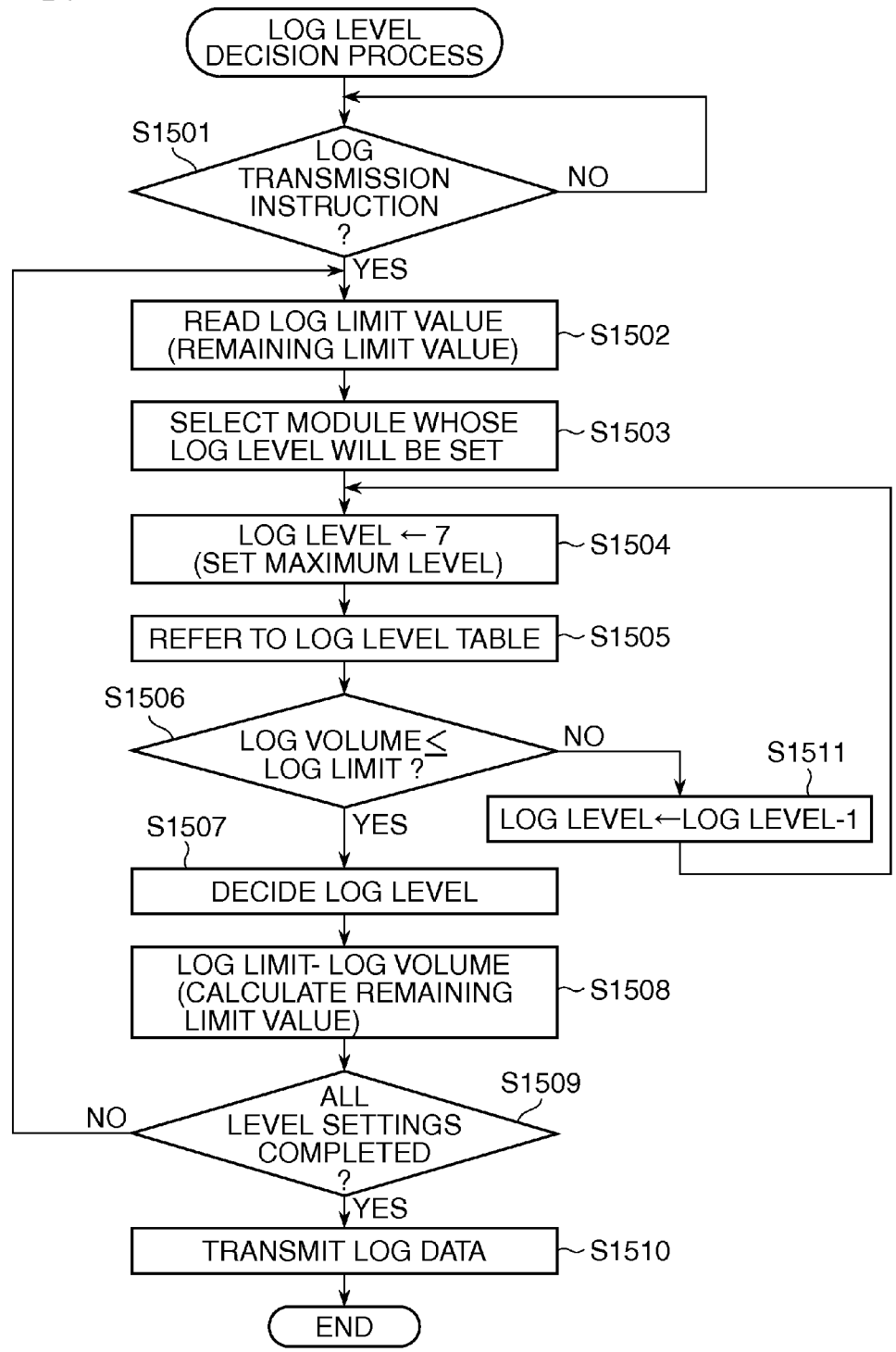
FIG. 14 is a flowchart showing a log level decision process of the image forming apparatus according to a second embodiment.

FIG. 14 is a flowchart showing a log level decision process of the image forming apparatus according to the second embodiment. FIG. 15 is a reference view showing the calculation process that results in a concrete log level decision based on the process of FIG. 14, and shows a process for determining log levels for two software modules.

The fundamental concept is the same as that of the process shown in FIG. 12. That is, the log level of the first software module is decided in response to the limit value of the log volume. And when deciding the log level of the second software module, the log volume based on the above-mentioned log level is deducted from the limit value of the log volume. The log level of the second software module "UI" is determined based on the log volume that becomes the maximum within the limits as the remaining limit values of the deducted result.

The first software module is an OS such as the OS 501 in FIG. 5, and the second software module is a UI (user interface) such as the UI 506 in FIG. 5. When the system software includes third and fourth software modules, log levels are decided by finding the remaining log volume in the same manner.

The log level decision process of the second embodiment is carried out by the CPU 1201 that executes the program developed on the RAM 1202.

First, the CPU 1201 waits a log transmission instruction in S1501. Receiving the instruction, the CPU 1201 reads the limit value (1512 in FIG. 15) of the log volume, which has set in advance, in S1502. In S1503, the CPU 1201 selects a module whose log level will be set.

Then, the CPU 1201 sets the log level of the first software module (OS) as the maximum level "7". Next, the CPU 1201 refers to the log level table of FIG. 15 to find the log volume corresponding to the log level "7" in S1505.

Then, in S1506, the CPU 1201 compares the limit value read in S1502 and the log volume found in S1505. In the examples 1512 and 1513 in FIG. 15, the log volume in the log level "7" is 90 MB/s, while the limit value is 100 MB/s. This satisfies the condition where the log volume is lower than the limit value (1514 in FIG. 15). Therefore, the log level of the first software module is determined as "7" (S1507).

Next, the CPU 1201 calculates the remaining limit value (1515 of FIG. 15) by subtracting the log volume corresponding to the log level "7" that is determined for the first software module from the above-mentioned limit value in S1508. The CPU 1201 returns the process to S1502 to determine the log level of the second software module (UI).

In S1502, the CPU 1201 reads the remaining limit value calculated in S1508 (1516 in FIG. 15). The second software module is selected in S1503. And in the next step S1504, the log level is set as "7". Then, the CPU 1201 refers to the log level table of the second software module to find the log volume corresponding to the log level "7" (1517 in FIG. 15) in S1505.

Then, in S1506, the CPU 1201 compares the limit value read in S1502 and the log volume found in S1505. In the example of FIG. 15, since the found log volume is larger than the limit value, the CPU 1202 lowers the log level by "1" in S1511. And then, the CPU 1202 repeats finding the log level volume in S1505 and the comparison of the log volume with the limit value in S1506. In the example of FIG. 15, since the log volume is smaller than the limit value when the log level is decreased to "2", the log level of the second software module is determined as "2" (1517, 1518 in FIG. 15).

Determining the log level, the CPU 1202 judges that the settings of the log levels for all the software modules have been completed in S1509, and transmits the log data based on the determined log levels in S1510 (1519 in FIG. 15).

<Advantages of Second Embodiment>

According to the second embodiment, since the log levels of the software modules are controlled individually, the contents of the log data can be individually controlled for each module. That is, the detailed degree of the log data (simple log data or detailed log data) can be decided for each software module. For example, the detailed degree can be controlled so that the log data for the OS process are taken as detailed as possible and the log data for the UI process are taken as simple on the contrary.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, a ROM, and the like. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-127389, filed on May 14, 2008, which is hereby incorporated by reference herein in its entirety.

What is claimed is:

1. An image forming apparatus comprising:
    an output unit adapted to output log data to an external device, wherein the log data is information indicating an operation condition of the image forming apparatus;
    a setting unit adapted to set a limit value of acceptable volume of the log data to be outputted by said output unit; and
    a decision unit adapted to decide a log level of the log data outputted by the output unit based on the limit value set by the setting unit,
    wherein the decision unit is adapted to decide the log level from a plurality of log levels corresponding to respective volumes of the log data to be outputted by the output unit.

2. The image forming apparatus according to claim 1, wherein the limit value set by said setting unit is a limit value of a bus band that can be allocated to output the log data that is needed in order to maintain a performance of the apparatus.

3. The image forming apparatus according to claim 1, further comprising:
    a storage unit adapted to store a table in which the plurality of log levels respectively are set in connection with a plurality of corresponding volumes of the log data;
    a comparison unit adapted to compare at least some of the plurality of corresponding volumes with the limit value by referring to the table; and
    an identifying unit adapted to identify one of the plurality of corresponding volumes as a selected volume that is lower than the limit value based upon a comparison result by said comparison unit,
    wherein the decision unit is adapted to select the decided log level when said identifying unit identifies the selected volume, the decided log level being a log level that corresponds to the selected volume in the table.

4. A control method for an image forming apparatus, the method comprising:
    an output step of an output unit of the image forming apparatus outputting log data to an external device, wherein the log data is information indicating an operation condition of the image forming apparatus;
    a setting step of setting a limit value of acceptable volume of the log data to be outputted by the output unit; and
    a decision step of deciding a log level of the log data outputted by the output unit based on the limit value set in the setting step, wherein the decision step decides the log level from a plurality of log levels corresponding to respective volumes of the log data to be outputted by the output unit.

5. A computer-readable storage medium storing a control program executing a control method for an image forming apparatus, said control method comprising:

an output step of an output unit of the image forming apparatus outputting log data to an external device, wherein the log data is information indicating an operation condition of the image forming apparatus;

a setting step of setting a limit value of acceptable volume of the log data to be outputted by the output unit; and a decision step of deciding a log level of the log data outputted by the output unit based on the limit value set in the setting step, wherein the decision step decides the log level from a plurality of log levels corresponding to respective volumes of the log data to be outputted by the output unit.

* * * * *